[19] United States Patent
Berg et al.

[11] 4,073,755
[45] Feb. 14, 1978

[54] PULVERULENT, TACKFREE, POURABLE, FILLER-CONTAINING ELASTOMER MIXTURES OPTIONALLY CONTAINING PLASTICIZER OIL, AS WELL AS PROCESSES FOR THEIR PRODUCTION AND UTILIZATION

[75] Inventors: Gerhard Berg; Karl-Heinz Nordsiek, both of Marl, Germany

[73] Assignee: Chemische Werke Huels Aktiengesellschaft, Marl, Germany

[21] Appl. No.: 604,133

[22] Filed: Aug. 13, 1975

[30] Foreign Application Priority Data

Aug. 16, 1974 Germany ............................ 2439237

[51] Int. Cl.² .......................... C08K 3/36; C08L 1/28; C08L 9/00
[52] U.S. Cl. .................... 260/17.4 BB; 260/29.6 XA; 260/29.7 R; 260/29.7 T; 260/29.7 N; 260/29.7 GP; 260/29.7 EM; 260/29.7 M; 260/42.46; 260/42.47; 260/42.55
[58] Field of Search ................. 260/29.6 XA, 29.7 R, 260/29.7 T, 29.7 N, 29.7 EM, 29.7 M, 42.46, 42.47, 42.55, 29.7 GP, 17.4 BB

[56] References Cited

U.S. PATENT DOCUMENTS

| 3,441,530 | 4/1969 | Bauer et al. | 260/42.47 |
| 3,563,932 | 2/1971 | Varnagy et al. | 260/42.47 |
| 3,846,365 | 11/1974 | Berg et al. | 260/42.47 |
| 3,895,035 | 7/1975 | Berg et al. | 260/42.55 |
| 3,920,604 | 11/1975 | Berg et al. | 260/42.54 |
| 3,922,240 | 11/1975 | Berg et al. | 260/42.57 |
| 3,929,707 | 12/1975 | Berg et al. | 260/42.57 |
| 3,945,978 | 3/1976 | Berg et al. | 260/42.57 |
| 3,998,778 | 12/1976 | Berg et al. | 260/33.6'AQ |

Primary Examiner—Donald E. Czaja
Assistant Examiner—H. H. Fletcher
Attorney, Agent, or Firm—Millen & White

[57] ABSTRACT

In a process for the production of pulverulent, tackfree, pourable, filler-containing elastomer particles by precipitating a stable, emulsified, homogeneous mixture of an aqueous elastomer emulsion and an aqueous dispersion of a solid filler for said elastomer in the presence of sodium silicate to form an aqueous suspension of the precipitated elastomer and the filler, the improvement which comprises:

a. precipitating the silicic acid in the aqueous suspension at a pH of 4.0 to 9.0, and then
b. mixing the thus-produced suspension of elastomer, filler and precipitated silicic acid with additional filler in the form of an emulsifier-free aqueous suspension.

22 Claims, 1 Drawing Figure

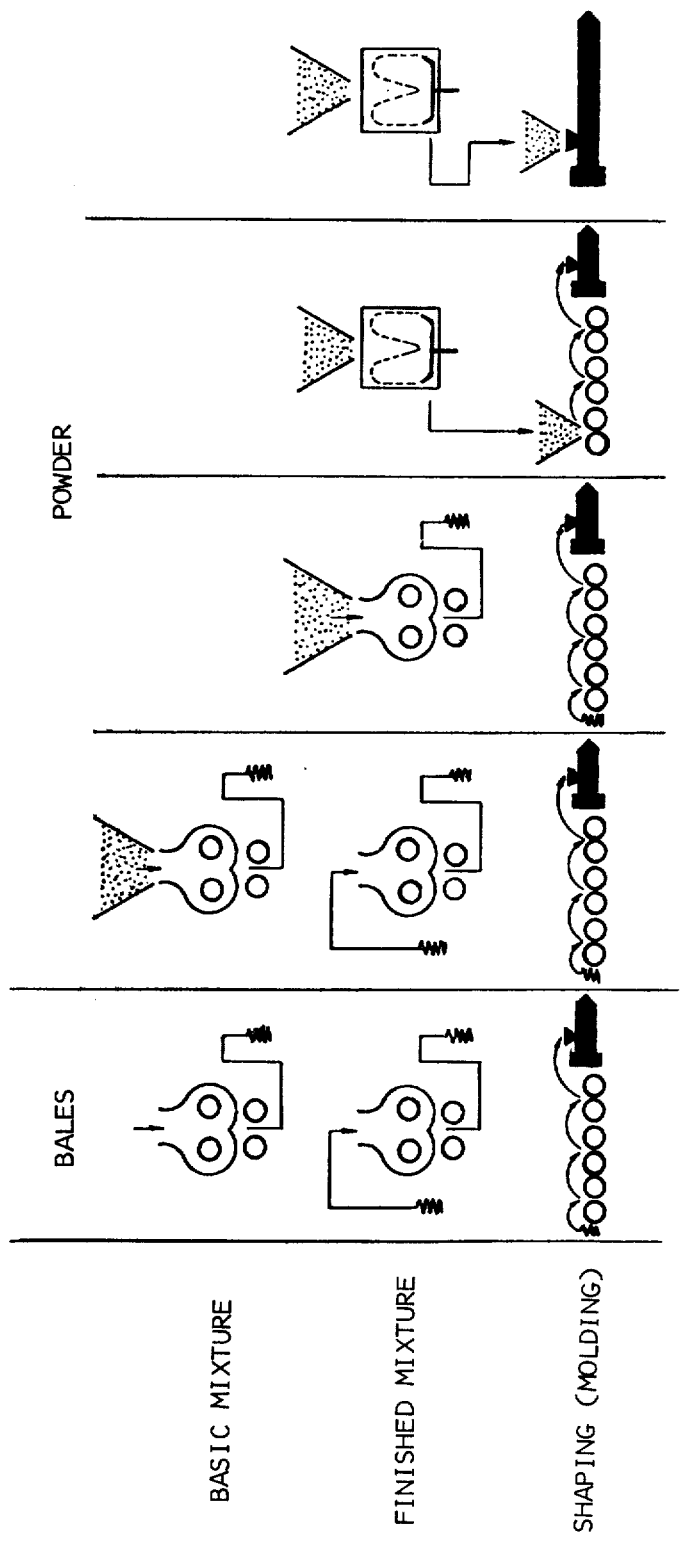

PULVERULENT, TACKFREE, POURABLE, FILLER-CONTAINING ELASTOMER MIXTURES OPTIONALLY CONTAINING PLASTICIZER OIL, AS WELL AS PROCESSES FOR THEIR PRODUCTION AND UTILIZATION

BACKGROUND OF THE INVENTION

Cross-Reference to Related Applications

Various aspects of powder elastomer technology are described in U.S. Pat. No. 3,846,365 and in copending, commonly assigned U.S. patet application Ser. Nos. 343,433 filed Mar. 21, 1973 and now U.S. Patent No. 3,895,035; Ser. No. 421,819 filed Dec. 5, 1973 and now U.S. Pat. No. 3,920,604; Ser. No. 468,669 filed May 10, 1974 and now U.S. Patent 3,945,978; Serial No. 471,161 filed May 17, 1974 and now U.S. Patent 3,922,240; Serial No. 483,709 filed June 27, 1974 and now U.S. Pat. No. 3,923,707; and Serial No. 480,598 filed June 18, 1974 and now U.S. Patent 3,929,707, the contents of which are incorporated by reference herein.

Description of the Prior Art

Heretofore, elastomer mixtures have been produced in the rubber industry by a discontinuous mode of operation. The main reason for this is the form in which the elastomer raw material is present, namely in bale form. The comminution of the bale and the intimate mixing with fillers, mineral oil plasticizers and auxiliary vulcanizing agents takes place on rolling mills or in internal mixers. The operation of these machines requires great energy expenditures. During circulation of the highly viscous material, this energy is quickly converted into heat. To avoid quality impairment by molecular changes or premature vulcanizations, the mixture is produced in several process stages and in general is stored between the various stages. The internal mixers and/or rolling mills are followed by extruder-pelletizers or extruder-roller dies. Such a discontinuous processing operation requires great expenditures of time, energy and personnel.

Only an entirely novel processing technology can lead out of this extremely unsatisfactory technique of elastomer processing. Therefore, during the course of recent years, the utilization of pourable elastomer powders has been discussed to an increasing extent, because there is no doubt that processing raw material in this form will greatly reduce the technical, personnel and energy expenditures in the rubber industry and will provide, while eliminating the heretofore customary heavy machinery, the prerequisites for a single-stage and automated mode of operation. This affords for the first time the possibility of being able to process elastomer mixtures in the same way as synthetic resin powders.

A large number of publications exists dealing with pulverulent elastomer mixtures and with the possibilites of pulverized elastomer technology. However, a close look reveals that the subject matter almost always involves pulverulent nitrile elastomers and emulsion copolymers of butadiene with styrene as coprecipitates with silicic acid. Powdery elastomer mixtures on the basis of all-purpose elastomers, as they are of the highest interest particularly for the tire industry, have neither been widely described nor widely produced. Only in most recent times have ways now been disclosed for the preparation of pulverulent, pourable elastomer-filler mixtures, preferably elastomer-carbon black mixtures, on the basis of all-purpose elastomers (cf. the aforementioned U.S. patents). Especially valuable all-purpose elastomers employed in this connection were polybutadienes prepared in organic solvents with lithium catalysts having vinyl group contents of 25–60%, e.g., as described in U.S. Pat. No. 3,829,409.

In accordance with the thus-provided state of the art, it was possible to convert, as special elastomers, also stereoregular block polymers with crystalline and/or thermoplastic proportions, arranged in block form, into pulverulent elastomer mixtures, e.g., as described in U.S. Pat. No. 3,923,707. Primarily worth mentioning are the known ethylene-propylene copolymers, as well as ethylene-propylenediene terpolymers, the ethylene content of which is between 65 and 80%, and the Raman crystallinity of which ranges between 0.3 and 1.5 R. Elastomers of the claimed microstructure have become known in the meantime as EPD- and EPDM-sequence types, respectively. Additional special elastomers heretofore advantageously used are solution copolymers of butadiene and styrene, the starting monomers of which are present after the polymerization partially or predominantly in a block-type arrangement.

The processes for the production of powdery elastomer mixtures involved, in accordance with the cited state of the art, the steps of emulsifying the solutions of the aforementioned elastomers in water with the aid of special, surface-active compounds; mixing these emulsions with aqueous dispersions of fillers, preferably carbon blacks; and subjecting the stable mixtures of the aqueous emulsions of the elastomer solutions and the fillers to a precipitating step. With the use of suitable drying methods, pulverulent elastomer mixtures were obtained having a freely flowing consistency.

The essential prerequisite for obtaining the abovedescribed, filler-containing, pulverulant elastomer mixtures proved to be, in addition to the measures of process technology, certain molecular parameters of the elastomers, as well as the kind, quantity and activity of the fillers and of other mixture components introduced into the composition and the quantitative ratio of elastomer to carbon black. Elastomers having a very broad molecular weight distribution, i.e., those having a relatively high low-molecular weight proportion, especially those having a more tacky consistency, could not be utilized in the aforedescribed process, and neither usable were fillers having low activity stages and/or powdery elastomer mixtures having a filler proportion of less than 60 parts by weight based on 100 parts by weight of elastomer. Pulverulent elastomer mixtures of such elastomers and fillers, optionally including critical additives, such as, for example, plasticizer oils or resins, showed impairment in the pourability and shelf life of the powder mixtures. The problem was still unsolved how to produce from elastomer latices, as they are obtained, for example, in the aqueous emulsion copolymerization of butadiene with styrene, carbon-black-containing, pulverulent elastomer mixtures directly from the latices, eliminating the completely uneconomical processing of bales dissolved in organic solvents.

Consequently, there exits the problem — as a genuine, economical-technical need evolving from the above considerations — of developing a novel process for the production of pulverulent, filler-containing basic elastomer mixtures, by means of which it is not only possible to widen the array of heretofore usable elastomer types on the basis of solution polymerizates by elastomer types previously unsuitable for this purpose, and to include fillers of lower activity stages, but which also makes the heretofore excluded aqueous elastomer latices available for the manufacture of filler-containing, preferably carbon-black-containing, pulverulent elastomers.

OBJECTS OF THE INVENTION

Accordingly, it is a general object of this invention to provide an improved process for the preparation of pourable, powdery, filler-containing elastomer particles.

Another object of this invention is a two-stage process for incorporating fillers into said particles, whereby elastomers having a broad molecular weight distribution can now be employed.

A further object of this invention is such a process which is useful for inactive as well as strengthening fillers.

An additional object of this invention is such a process which is applicable to powdery elastomer mixtures having a filler content of less than 60 parts by weight per 100 parts by weight of elastomer.

A more particular object of this invention is a process for increasing the bulk density of filler-containing elastomer particles.

Upon further study of the specification and appended claims, further objects and advantages of this invention will become apparent to those skilled in the art.

SUMMARY OF THE INVENTION

Briefly, the above and other objects are attained in one aspect of the present invention by providing in a process for the production of pulverulent, tack-free, pourable, filler-containing elastomer particles by precipitating a stable, emulsified, homogeneous mixture of an aqueous elastomer emulsion and an aqueous dispersion of a solid filler for said elastomer in the presence of sodium silicate to form an aqueous suspension of the precipitated elastomer and the filler, the improvement which comprises:

a. precipitating the silicic acid in the aqueous suspension at a pH of 4.0 to 9.0, and then b. mixing the thus-produced suspension of elastomer, filler and precipitated silicic acid with additional fillers in the form of an emulsifier-free aqueous suspension.

DETAILED DISCUSSION

The present invention relates to a process for the production of pulverulent, tack-free, pourable, filler-containing, basic elastomer mixtures which optionally contain plasticizer oil, by mixing elastomer latices or aqueous emulsions of elastomer solutions optionally containing plasticizer oil with aqueous dispersions of solid fillers, optionally containing plasticizer oil; introducing these mixtures into water which contains a precipitant; precipitating the basic elastomer mixtures, optionally while simultaneously removing the elastomer solvent by distillation; separating the thus-precipitated basic elastomer mixture from the water; and drying the elastomer mixture under constant agitation.

The characterizing feature of this process resides in that elastomer latices or aqueous, stable emulsions of elastomer solutions optionally containing plasticizer oil are combined with less than the intended total amount, e.g., 20–99% by weight, preferably 50–90% by weight, of fillers, optionally containing plasticizer oil, in the form of their aqueous dispersions or suspensions into stable, homogeneous mixtures and the stable, homogeneous mixtures are passed on to a multistage precipitating procedure, by 1. introducing, under mixing, these stable homogeneous mixtures into water which contains a precipitating amount of sodium silicate, thus precipitating the elastomer and the filler together as a pulverulent elastomer premix, and optionally removing any present elastomer solvent by distillation;

2. adjusting the thus-obtained aqueous suspension of the elastomer premix, in the presence of a compound effecting the immediate precipitation of silicic acid in the suspension, to a pH of 4.0–9.0, preferably 6.0–8.0; and 3. mixing the thus-obtained suspension of elastomer premix and precipitated silicic acid with the remaining 1–80%, preferably 10–50%, of the intended total amount of fillers in the form of an aqueous suspension.

The elastomer premix is understood to mean, according to this invention, a mixture which, though containing the total quantity of elastomer, includes only part of the total amount of fillers. The quantity of fillers contained in the elastomer premix can vary between 20 and 99% by weight, preferably between 50 and 90% by weight, based on the total amount of fillers.

The basic elastomer mixture of this invention contains, in addition to the total amount of elastomer, also the desired total quantity of fillers. These pulverulent basic elastomer mixtures obtained according to the process of this invention have particle sizes average diameter of about 0.001–1.5 mm., especially 0.05–1.0 mm., preferably 0.25–0.9 mm.

Suitable for the process of this invention are in general all solution polymerized elastomers (in the form of their solution), as well as synthetic elastomers produced by emulsion polymerization in the form of their aqueous latices.

Examples for solution polymers include but are not limited to polybutadienes, polyisoprenes, copolymers of butadiene with styrene, EPM and EPDM polymers, as well as ring-opening polymers of cycloolefins such as described by K. W. Scott et al in Rubber Chemistry Technology 44:1341 (1971); the catalysts employed are either Ziegler catalysts or lithium catalysts, depending on the monomer and the polymer properties.

Feasible solvents are aliphatic hydrocarbons, e.g., pentane, hexane, heptane, etc. or aromatic hydrocarbons, e.g., benzene or toluene. Preferred are polymers produced in an aliphatic solvent which can be utilized directly in the form of the solution obtained after short-stopping the polymerization and stabilization. Otherwise, the elastomer can also be brought into an emulsifiable form by redissolution.

Particularly preferred are polybutadienes, polyisoprenes, and copolymers of butadiene with styrene in the form of their lithium polymers produced in aliphatic hydrocarbons.

Preferred aqueous latices are the emulsion copolymers of butadiene with styrene and butadiene with acrylonitrile for use in the process of this invention.

It is also possible according to the process of the present invention to produce pulverulent elastomer mixtures containing not only a single elastomer, but mixtures of two or more different elastomers, e.g., a mixture of polybutadienes with varying vinyl group contents and polyisoprenes. For this purpose, the elastomer solutions, or more advantageously the aqueous emulsions of the elastomer solutions, are mixed together and processed according to the invention to filler-containing, pulverulent elastomer mixtures. Also the elastomer latices can be processed analogously in accordance with the invention in combination with one another.

Preferred fillers are the carbon blacks of all activity stages customary in the rubber industry, for example, SAF (super abrasion furnace), ISAF (intermediate super abrasion furnace), HAF (high abrasion furnace) carbon blacks, including the modifications thereof, FEF (fast extruding furnace), GPF (general purpose furnace), APF (all purpose furnace), SRF (semireinforcing furnace) and MT (medium thermal) blacks. However, mineral substances can also be incorporated, such as, for example, highly active silicic acid, kaolin and ground slate. The fillers can be processed in the first stage of the procedure of this invention as emulsifier-containing aqueous dispersions, as well as emulsifier-free aqueous suspensions. In the last stage of the precipitation process, the residual amount of filler is always introduced as an emulsifier-free suspension.

The amount of carbon black filler to be utilized can be 20-400% by weight, preferably 40-110% by weight, based on the elastomer.

The amount of mineral substance filler ranges between 20-500% by weight, preferably 30-150% by weight, based on the elastomer.

Combinations of carbon blacks with light-colored fillers are of course also possible.

If plasticizer oils are to be incorporated, the refinery products customary for this purpose are employed, which consist, depending on the purpose for which the vulcanized products will be used, preferably of aromatic, naphthenic or paraffinic hydrocarbons. The quantity of plasticizer oils to be utilized ranges between 1-100% by weight, preferably 30-60% by weight, based on the elastomer.

To produce a carbon black-elastomer base mixture containing plasticizer oil, it is possible on the one hand to stir the plasticizer oil into the elastomer solution before the emulsifying step.

A second possibility, normally more advantageous, resides in first combining the plasticizer oil and the carbon black in suitable mixing devices (see U.S. Pat. No. 3,945,978) converting the thus-obtained, tack-free, pulverulent mixture into an aqueous suspension or dispersion, and introducing the latter under agitation into the aqueous emulsion of the elastomer solution and/or into the elastomer latex. The further process steps are identical to those described above.

Suitable as emulsifiers for elastomer solutions and optionally for fillers can be those anionic, cationic and nonionic surfactants known from the elastomer technology and chemistry, optionally in combination with auxiliary emulsifiers, especially with high-molecular weight protective colloids. The type of emulsifier employed in accordance with this process, if desired in combination with an auxiliary emulsifier, depends to a large extent on the type of elastomer and filler, the elastomer combination, the filler activity, the properties of the basic elastomer mixtures resulting from further additives, as well as on the fact whether the elastomer is used in the form of its aqueous latex or in the form of the aqueous emulsion of its solution.

Suitable anionic emulsifiers are, for example, potassium oleate, sodium stearate, sodium "Dresinates" ® and sodium alkyl benzenesulfonates, as well as sodium salts of the sulfuric acid esters of higher aliphatic alcohols, such as, for example, mixtures of sodium cetyl sulfate and sodium stearyl sulfate.

Fillers, preferably carbon blacks — if necessary for producing a homogeneous elastomer-filler mixture — are dispersed in water in the presence of 0.1-5% by weight, preferably 1-3% by weight, of emulsifier, based on the filler.

Usable, high-molecular weight protective colloids an auxiliary emulsifying agents for elastomer solutions and fillers are, for example, sodium polyacrylates having molecular weights of 100,000-2,000,000, preferably 250,000-1,500,000, and cellulose derivatives, e.g., methylcelluloses, carboxymethylcelluloses and "Tyloses" (methylcelluloses).

The high-molecular weight protective colloids are employed preferably as 1% aqueous solutions in a amounts of 0.001-0.5% by weight, preferably 0.005-0.1% by weight, based on the elastomer solution, and in amounts of 0.01-1.0% by weight, preferably 0.05-0.5% by weight, based on the filler.

As a source of silicic acid, a sodium silicate solution is utilized with molar ratios of $Na_2O:SiO_2$ of 2:1 to 1:4. The amount of silicic acid to be liberated from the sodium silicate during the course of the process, calculated as $SiO_2$, can be 0.01-20% by weight, preferably 1-10% by weight, based on the total quantity of elastomer.

A suitable precipitant for the anionic and nonionic systems is acidified water, wherein the pH is to range between 1-4, preferably 1.5-2.5.

Aqueous sodium silicate solutions are employed as the precipitant for the cationic systems. The amounts of $SiO_2$ necessary for the precipitation and contained in the sodium silicate solution are 0.5-20 moles, preferably 1-8 moles per mole of the quaternary ammonium salt used as the emulsifier.

Among the nonionic emulsifiers, alkylamine oxyalkylates of the following general formula are utilized with great advantage:

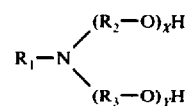

wherein $R_1$ is an alkyl or alkenyl group of 1-20 carbon atoms, preferably 12-18 carbon atoms, $R_2$ and $R_3$ are each an ethylene or propylene group, and X and Y are integers of 1-80 inclusive, preferably 6-20.

Suitable compounds are, for example, lauryl-, myristyl-, cetyl-, stearyl- and oleylamine polyglycol ethers.

Suitable cationic emulsifiers are preferably quaternary ammonium salts, for example, lauryldimethylbenzylammonium chloride, cetyltrimethylammonium chloride, lauryldimethylammonium ethyl sulfate, alkyl-$(C_{12}-C_{16})$-trimethylammonium bromide, cocodimethylbenzylammonium chloride, cetyldimethylbenzylammonium chloride, cetyldimethylethylammonium ethyl sulfate, distearyldimethylammonium chloride, as well as N-substituted salts of pyridine, such as, for example, lauryl pyridinium chloride, cetyl pyridinium bromide, tetradecyl pyridinium bromide, lauryl pyridinium bisulfate, etc.

In the emulsification of the elastomer solutions in water, the emulsifiers are used in amounts of 0.05–2.0% by weight, preferably 0.1–1.5% by weight, based on the elastomer solution.

According to the invention, suitable silicic acid precipitants employed are, on the one hand, mono- and polyvalent secondary and tertiary amines, as well as quaternary ammonium salts, and on the other hand, water-soluble salts of such metals forming difficultly soluble or insoluble salts with alkali silicates. Tertiary amines obtained by condensation of alkyl amines with ethylene oxide and propylene oxide are especially preferably utilized, such as, for example, laurylamine polyglycol ether, stearylamine polyglycol ether, oleylamine polyglycol ether and cocosamine polyglycol ether, as well as condensation products of 2,2,4-trimethylhexamethylenediamine-1,6 with propylene oxide and ethylene oxide. Especially suitable are the salts of the metals of Main (A) Groups II and III and Subgroups (B Groups) II and VIII of the Periodic Table of the Elements, e.g., magnesium chloride, zinc sulfate, iron chloride, iron sulfate, cobalt nitrate, nickel sulfate, but preferably watersoluble salts of aluminum, such as, for example, aluminum chloride and aluminum sulfate. The precipitants are used in amounts of 1–50% by weight, preferably 5–20% by weight, based on the $SiO_2$.

The amines of this invention can be introduced into the process with all substance streams before the second precipitation stage, as well as with the media serving for neutralization. The water-soluble metallic salts, however, are added only after the neutralization effected in the second precipitation stage.

If the emulsification of the elastomer solutions is conducted in water or the production of aqueous filler dispersions is effected in the presence of the silicic acid precipitants of this invention as the emulsifiers, for example, laurylamine polyglycol ether, the introduction of additional precipitants can be omitted since, in the first stage of the precipitation process, the alkylamine polyglycol ethers are deactivated in the presence of acid and, inasmuch as they are water-soluble, are available in sufficient quantities in the second stage after neutralization for initiating the instant precipitation of the dissolved silicic acid. In case of particularly critical mixtures, such as those of cis-1,4-polyisoprene with a pronounced inherent tackiness, however, it is always advantageous to additionally employ water-soluble metallic salts, preferably aluminum salts.

The temperatures in the precipitation stages are, in all pressure conditions, above the azeotropic boiling point of elastomer solvents and water. Under normal pressure, the process is preferably conducted between 60° and 100° C., the temperatures increasing from one stage to the next. Under these conditions, the elastomer solvent is continuously distilled off.

The process of this invention obtains its superior significance by the following two measures:

1. The stepwise incorporation of the fillers, preferably carbon black, into and onto the elastomer; and
2. The immediate precipitation of controlled smaller amounts of silicic acid, adapted to the respective usage, effected after the precipitation of the basic elastomer mixture, in before the preparation of the basic elastomer mixture, in the second stage of the precipitation process after the neutralization of the aqueous charge.

In general, the larger proportion of the quantity of fillers is combined, in the first stage of the multistage process of this invention, with the total elastomer to form a pulverulent premix. The necessity or possibility of employing this quantity of fillers as a. an aqueous, emulsifier-containing dispersion; or b. an emulsifier-free aqueous suspension depends exclusively on the compatibility of the elastomer latices or the aqueous emulsions of the elastomer solutions with the aqueous filler systems. To obtain stable and homogeneous latex-filler, preferably latex-carbon black mixtures, the fillers, especially the carbon blacks, must be introduced in accordance with (a). Normally, the aqueous emulsions of the elastomer solutions do not require this compulsory step. They can be mixed with the fillers, especially carbon blacks, in accordance with (a) as well as (b). The resultant mixtures are homogeneous and stable.

The residual amount of fillers, which is normally smaller, i.e., less than one-half of the total amount to be added, is introduced as an emulsifier-free aqueous suspension into the last stage of the precipitation procedure. The finished basic elastomer mixture is formed from the elastomer premix, precipitated silicic acid and the residual filler.

According to the invention, the silicic acid is introduced into the first precipitation stage of the process as sodium silicate. However, it is also possible to feed the silicic acid to substances and/or substance streams prior to neutralization, i.e., for example, to the emulsions, the filler dispersions or the filler suspensions, or mixtures of emulsions and fillers.

The advance in the art attained by the process of this invention resides essentially in broadening the solution-elastomer spectrum suitable in this connection and in incorporating the latices obtained by emulsion polymerization into the process. However, as a consequence of the novel process technology, a surprising and unforeseeable, marked increase in the bulk densities of the pulverulent elastomer base mixtures is likewise attained, i.e., the percentage increase of bulk density generally changes from about 16–86%. The increase in bulk density, in turn, effects a considerable increase in the pouring velocity of the powdery elastomer mixtures, measured in accordance with ASTM-D 1895-69, i.e., the percentage increase of pouring velocity generally changes from about 22% to 150%.

Thus, by means of this phenomenon, a contribution has also been made toward the qualitative improvement of the powdery basic elastomer mixtures producible according to the prior art, having an advantageous effect primarily in the areas of storage, conveyance and transportation. Another decisive advantage in process technology is attained due to the enormous saving in expensive work for the comminution of the elastomer materials which heretofore were customarily present in bale form, and in the mixing work which normally followed the comminution process.

From the pulverulent elastomer base mixtures consisting generally of elastomer fillers, it is possible to produce, in a comparatively simple manner, vulcanizable elastomer finished mixtures by admixing thereto, in modern fluid mixers, the usual additives such as further fillers, plasticizer oils, resins, ozone-protection and antiaging substances, as well as cross-linking chemicals, without the occurrence of shearing forces. The direct use of such pulverulent finished elastomer mixtures in the final stage of the customary elastomer processing operation under the exclusion of heavy machinery with high energy requirements thus become possible in a surprisingly simple and economical manner. The finished powder mixtures stemming from the products of this invention can, therefore, be fed directly into special extruders or automatic injectionmolding machines. A good example for the successful conductance of the direct extrusion process is the "EVK System" developed by Werner & Pfleiderer (H. Koch; "Gummi, Asbest, Kunststoffe" [Rubber, Asbestos, Synthetic Resins] 1:31, 1974). The thus-attained efficiency as well as the quality of the resultant tread strips correspond to the results attained with the use of solid elastomers employing the customary multistage, complicated process technique. Thereby, the pulverulent elastomer mixtures of this invention have made the process close to tantamount to the methods of synthetic resin processing.

However, even when maintaining the customary process technique of the elastomer processing industry, the advantages when using the pulverulent elastomer mixtures of this invention are considerable. Thus, it has been found that the manufacture of vulcanizable finished elastomer mixtures, even with high proportions of active fillers, is possible in a simple and particularly economical manner in conventional internal mixers. In this procedure, as contrasted to the usual multistage mixing technique, the operating time is now drastically reduced in a single operating step to one-third to one-fourth of the customarily required total mixing time, with an energy consumption which is likewise reduced to approximately the same extent. The ejection temperatures lie only a little above 100° C. in this process.

Furthermore, without diminishing the aforementioned advantages, it is possible to additionally introduce further filler proportions under the same conditions. Also, it is possible to additionally incorporate smaller proportions of other solid elastomers.

The sequence in which the individual components are added in metered quantities in the internal mixer is of special importance for obtaining optimally short mixing times. The introduction of all components can be effected fully automatically, as contrasted to the feeding process which involves solid elastomer. In addition to the aforementioned extraordinary shortening of the mixing time, the additional possibility is thereby provided of reducing the charging period and consequently enormously increasing the degree of exploitation of conventional, very expensive mixing plants.

Consequently, the use of the pulverulent elastomer-filler base mixtures according to this invention leads, independently of the type of processing operation, in any event to extraordinary technical and economical advantages. The spectrum of possibilities extends from a drastic shortening of the mixing times with the use of customary devices, such as internal mixer and roller mills, up to a continuous conductance of the The claimed process will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The elastomer employed is a polybutadiene, obtained by adiabatic polymerization of butadiene in the presence of n-butyllithium, in the form of a 12.5% by weight solution thereof in hexane, the polybutadiene having the following analytical data:

| | |
|---|---|
| Mooney viscosity (ML-4) | 74 |
| Defo | 1025/33 |
| Gel content | 2.5% |
| Content of trans-1,4-proportions | 39% |
| Content of cis-1,4-proportions | 27% |
| Content of vinyl groups (1,2-proportions) | 34% |
| Viscosity of solution at 20° C. | 885 cp. |

216 Kg. of this polybutadiene solution is emulsified in 211 kg. of water with the aid of an emulsifying device of the type "Supraton 455 D" in the presence of 0.648 kg. of a laurylamine polyglycol ether with 12 ethoxy groups and 0.0432 kg. of a sodium polyacrylate of the Rohm company (designation of product "Plex 5367 F"). The pH is set to 11.5 by adding sodium hydroxide solution.

1,296 Kg. of a thus-prepared stable, aqueous emulsion of the polybutadiene solution is mixed under slight agitation with 500 kg. of an aqueous ISAF carbon black dispersion containing 50 kg. of ISAF black and 0.24 kg. of the aforementioned ethoxylated laurylamine.

The stable and homogeneous mixture containing 60 parts by weight of carbon black per 100 parts by weight of elastomer is stirred into an aqueous precipitating bath consisting of a mixture, heated to about 90° C., of 300 kg. of water, 9.6 kg. of 10% strength sulfuric acid, and 2.6 kg. of a 26% strength sodium silicate solution. While the solvent, hexane, is distilled off the carbon-black-containing elastomer premix is precipitated in finely divided form (first stage).

After the precipitation step is finished, the aqueous suspension of the carbon-black-containing elastomer premix is adjusted to pH 7.0 by adding sodium hydroxide solution (second stage).

After neutralization, the charge is combined with another 250 kg. of a 10% aqueous ISAF black suspension, corresponding to 30 parts by weight of carbon black per 100 parts by weight of elastomer (third stage).

The thus-prepared basic elastomer mixture is separated from the water and dried under constant agitation, thus obtaining a pulverulent, well pourable basic elastomer mixture. In a 200-liter fluid mixer of the Henschel type, a finished mixture of the composition set forth below is produced from this powdery basic elastomer mixture:

| | | |
|---|---|---|
| Pulverulent basic elastomer mixture | 190 | parts by weight |
| Aromatic plasticizer oil ("NAFTOLEN" MV) | 50 | parts by weight |
| Stearic acid | 2.5 | parts by weight |
| Zinc oxide | 4.0 | parts by weight |
| Coumarone resin | 2.5 | parts by weight |
| Sulfur | 2.0 | parts by weight |
| "VULKACIT" CZ | 1.0 | parts by weight |
| "VULKALENT" B/C | 0.5 | parts by weight |

The following mixture sequence results at a speed of 650 r.p.m.:

| | | |
|---|---|---|
| Pulverulent Basic Elastomer Mixture | Addition | 0–5 Seconds |
| Plasticizer Oil | Addition | 5–105 Seconds |
| | Remixing | 105–120 Seconds |
| Sulfur "VULKACIT" CZ Zinc Oxide | Addition | 120–135 Seconds |

-continued

| | Remixing Discharge | 135-180 Seconds After 180 Seconds |
|---|---|---|
| Stearic Acid | | |

The weight of each charge is 40 kg., the temperature of the mixed material is 50°-55° C.

The thus-attainable hourly efficiency with this mixing device ranges between 500 and 700 kg./hour, depending on the charging time. This corresponds to the capacity of an internal mixer, operating with solid rubber according to the two-stage process, with a chamber volume of 50 liters.

The resultant finished mixture is still just as well pourable and is fed in this form directly to a special extruder of the type "EVK 150" by the Werner & Pfleiderer company. At a screw speed of 40 r.p.m., a barrel temperature of 30° C., and an adapter temperature of 90° C., the yield in one hour is 490 kg. of extruded product in the form of a passenger car tire tread. This output corresponds to the results when this machine is fed with identically composed mixtures of the same elastomer in bale form.

The examination of the vulcanizate properties shows the following result:

| | Comparison Mixture of Solid Elastomer in Bale Form | Mixture of Pulverulent Basic Elastomer Mixture |
|---|---|---|
| Tensile Strength (kp./cm²) | 149 | 147 |
| Elongation at Yield (%) | 530 | 525 |
| Modulus 300% | 74 | 70 |
| Hardness (Shore A) | 61 | 63 |
| Elasticity 20° C. (%) | 32 | 33 |
| Tire Test Abrasion Index after 12,000 km. | 100 | 102 |

EXAMPLE 2

(Comparative Example 1)

Example 1 is repeated, with only the following alterations:

a. The entire amount of ISAF black — 90 parts by weight per 100 parts by weight of elastomer — is stirred into the emulsion of the elastomer solution immediately and quantitatively, rather than stepwise;

b. the neutralization of the charge is effected only after adding the entire amount of carbon black and after the finely divided precipitation of the basic elastomer mixture.

The pulverulent elastomer mixture according to Example 1 (process of the present invention) has a markedly increased bulk density and better pourability test values than the rubber mixture according to Example 2 (see Table 1).

TABLE 1

| Basic Elastomer Mixture | Pourability Test (*) sec. | Bulk Density g./l. |
|---|---|---|
| Example 1 | 16.8 | 515 |

TABLE 1-continued

| Basic Elastomer Mixture | Pourability Test (*) sec. | Bulk Density g./l. |
|---|---|---|
| Example 2 | 21.8 | 414 |

(*) The pourability test on the filler-containing, powdery elastomer mixtures is conducted according to the efflux time method of ASTM-D 1895-69, the efflux times, in seconds, are determined of respectively 100 g. of the powdery elastomer mixture from standardized funnels having an opening angle of 40° and a lower aperture diameter of 10 mm. All pourability test values relate to this measuring method.

EXAMPLE 3

The elastomer employed is a polybutadiene, obtained by adiabatic polymerization of butadiene in the presence of n-butyllithium, in the form of a 12.4% by weight solution thereof in hexane. The polybutadiene and its solution have the following analytical data:

| Mooney viscosity (ML-4) | 74 |
|---|---|
| Defo | 1025/33 |
| Gel content | 2.5% |
| Content of trans-1,4-proportions | 39% |
| Content of cis-1,4-proportions | 27% |
| Content of vinyl groups (1,2-proportions) | 34% |
| Viscosity of the solution at 20° C. | 885 cp. |

289 Kg. of this polybutadiene solution is emulsified in 281.5 kg. of water with the aid of an emulsifying device of the type "Supraton 455 D" in the presence of 0.867 kg. of a laurylamine polyglycol ether with 12 ethoxy groups. The pH is set to 11.5 by adding sodium hydroxide solution.

1,600 Kg. of a thus-produced aqueous emulsion of the polybutadiene solution is mixed under slight agitation with an aqueous suspension of 50 kg. of ISAF black, corresponding to 50 parts by weight of carbon black per 100 parts by weight of polybutadiene, in 450 kg. of water. Furthermore, 7.75 kg. of a 26% aqueous sodium silicate solution (SiO₂ content: 2.02 kg.) is introduced under stirring into the stable mixture.

The stable aqueous mixture of the emulsion of the elastomer solution, the carbon black dispersion, and the sodium silicate solution is stirred into an aqueous precipitating bath consisting of a mixture of 300 kg. of water and 24.55 kg. of 10% sulfuric acid, heated to about 90° C. While the solvent, hexane, is distilled off a carbon-black-containing rubber premix is precipitated in finely divided form. The pH of the aqueous phase is 1.8-2.3 during the precipitation step.

After the precipitating process is terminated, 250 g. of laurylamine polyglycol ether is stirred into the aqueous suspension of the carbon-black-containing rubber premix, and the aqueous phase is set to pH 6.5 by the addition of sodium hydroxide solution.

Another 25 kg. of ISAF black, corresponding to 25 parts by weight of carbon black per 100 parts by weight of elastomer, is introduced into the aqueous suspension of elastomer premix and precipitated silicic acid under agitation in the form of a 10% aqueous suspension. The finished basic elastomer mixture is separated from the water and dried under constant agitation. A pulverulent, well pourable, carbon-black-containing basic elastomer mixture is thus obtained. In an internal mixer of the type "GK 160" a finished mixture on the basis of the recipe set forth below is produced in a single step from this powdery basic elastomer mixture:

| | | |
|---|---|---|
| Pulverulent basic elastomer mixture | 190 | parts by weight |
| Aromatic plasticizer oil ("NAFTOLEN" MV) | 50 | parts by weight |
| Stearic acid | 2.5 | parts by weight |
| Zinc oxide | 4.0 | parts by weight |
| Coumarone resin | 2.5 | parts by weight |
| Sulfur | 2.0 | parts by weight |
| "VULKACIT" CZ | 1.0 | parts by weight |

At a rotor speed of 40 r.p.m. and a chamber temperature of 50° C., the mixing process is carried out according to the "upside down" method, i.e. all mixture components are added immediately at the beginning of the step in the sequence of plasticizer, powdery basic elastomer mixtures, chemicals. The mixing material reaches a temperature of 105° C. after 45 seconds and is discharged at this point in time as a compact finished mixture which is neither chalky nor crumbly. When fed thereafter to a rolling mill, a smooth, flawlessly rotating sheet results. The thus-obtained mixture is processed to tire treads as usual. The test results are as follows:

| | Comparison Mixture of Solid Elastomer in Bale Form | Mixture of Powdery Basic Elastomer Mixture |
|---|---|---|
| Mixing Time First Stage | 120 Seconds | Not Applicable |
| Output Temperature | 160° C. | |
| Energy kwhr/kg. | 0.13 | |
| Mixing Time Second Stage | 75 Seconds | 45 Seconds |
| Output Temperature | 110° C. | 105° C. |
| Energy kwhr/kg. | 0.07 | 0.06 |
| Tensile Strength (kp./cm$^2$) | 149 | 148 |
| Elongation at Yield (%) | 530 | 550 |
| Modulus 300% | 74 | 70 |
| Hardness (Shore A) | 61 | 61 |
| Elasticity 20° C. (%) | 32 | 31 |
| Tire Test Abrasion Index After 12,000 km. | 100 | 103 |

As compared to the process technique with solid elastomer, a reduction of the total mixing time as well as the energy expenditure is obtained to less than ½ with a qualitatively identical end result.

EXAMPLE 4

(Comparative Example 2)

Example 3 is repeated with only the following modifications:

a. The ISAF black, 75 parts by weight per 100 parts by weight of elastomer, is introduced immediately and quantitatively into the process rather than in stages;

b. no sodium silicate is added;

c. after precipitation of the elastomer-carbon black mixture, the charge is not neutralized with sodium hydroxide solution.

The powdery basic elastomer mixture according to Example 3 (process of this invention) has a markedly increased bulk density and better pourability test values than the mixture according to Example 4 (see Table 2).

TABLE 2

| Basic Elastomer Mixture | Pourability Test sec. | Bulk Density g./l. |
|---|---|---|
| Example 3 | 17.0 | 508 |
| Example 4 | 25.0 | 326 |

EXAMPLE 5

As in Example 1, a polybutadiene produced by the adiabatic lithium polymerization of butadiene is utilized as the elastomer in the form of a 12.5% solution thereof in hexane, the elastomer having the following analytical data:

| | |
|---|---|
| Mooney viscosity (ML-4) | 80 |
| Defo | 1150/34 |
| Gel content | <2% |
| Content of trans-1,4-proportions | 35% |
| Content of cis-1,4-proportions | 26% |
| Vinyl group content (1,2-proportions) | 39% |
| Viscosity of the solution at 20° C. | 1020 cp. |

With the aid of an emulsifying device of the type "Supraton 455 D" 222.5 kg. of this polybutadiene solution is emulsified in 218 kg. of water in the presence of 1.334 kg. of laurylamine polyglycol ether with 12 ethoxylate units and 0.445 kg. of a sodium polyacrylate by the Rohm company (product name "Plex 5367 F"). The pH is set to 11.5 by adding sodium hydroxide solution.

1,335 Kg. of a thus-prepared aqueous emulsion of the polybutadiene solution is combined under slight agitation with an aqueous dispersion of 50 kg. of SRF black, corresponding to 60 parts by weight of carbon black per 100 parts by weight of elastomer, in 550 kg. of water containing 0.5 kg. of laurylamine polyglycol ether with 12 ethoxy units and 0.226 kg. of 10% sodium hydroxide solution, thus forming a stable mixture. Additionally, 38.5 kg. of a sodium silicate solution is added to this mixture under stirring, the SiO$_2$ content of the sodium silicate solution corresponding to 10 kg.

The stable and homogeneous mixture from the emulsion of the elastomer solution, the carbon black dispersion, and the sodium silicate solution is stirred into an aqueous precipitation bath consisting of a mixture of 300 kg. of water and 1.5 kg. of 10% sulfuric acid, heated to about 90° C. The pH of the aqueous phase is 1.5. While the solvent, hexane, is distilled off and the carbon-black-containing elastomer premix is precipitated in finely divided form, another 84.5 l. of 10% sulfuric acid is introduced continuously until the end of the coagulation, whereby the pH in the precipitation bath is maintained at 1.7-2.0.

After the precipitating step is finished, the pH value of the aqueous suspension of the hexane-free, finely divided, carbon-black-containing elastomer premix is set to pH 6.7 by adding 28.25 l. of 10% sodium hydroxide solution. The temperature is still 90° C.

Another 25 kg. of SRF carbon black, corresponding to 30 parts by weight of carbon black per 100 parts by weight of rubber, is stirred into this aqueous suspension of finely divided, carbon-black-containing rubber premix and precipitated silicic acid in the form of a suspension in 225 kg. of water.

The thus-produced finely divided basic elastomer mixture is separated from the water and dried under constant agitation, yielding a pulverulent, pourable basic elastomer mixture.

EXAMPLE 6

(Comparative Example 3)

Example 5 is repeated with the following modifications:

a. The SRF black, 90 parts by weight per 100 parts by weight of polybutadiene, is immediately stirred quantitatively into the emulsion of the elastomer solution, rather than stepwise;

b. no sodium silicate is added;

c. the pH of the aqueous coagulate slurry is set to 6.5 by adding sodium hydroxide solution only after the precipitation of the entire basic elastomer mixture.

The powdery basic rubber mixture according to Example 5 (process of this invention) possesses a considerably higher bulk density and shows substantially better pourability characteristics than the mixture according to Example 6 (see Table 3).

TABLE 3

| Basic Elastomer Mixture | Pourability Test sec. | Bulk Density g./l. |
|---|---|---|
| Example 5 | 18.2 | 410 |
| Example 6 | 40.0 (*) | 221 |

(*) The product can be poured only after tapping of the test beaker.

EXAMPLE 7

The elastomers employed are polybutadiene produced by the adiabatic lithium polymerization and polyisoprene in a quantitative ratio of 70 parts by weight of polybutadiene and 30 parts by weight of polyisoprene in the form of the 10% by weight solutions thereof in hexane. The elastomers have the following analytical data:

| Polybutadiene* | |
|---|---|
| Mooney viscosity (ML-4) | 80 |
| Defo | 825/30 |
| Gel content | <2% |
| trans-1,4-Content | 35% |
| cis-1,4-Content | 26% |
| Vinyl group content (1,2-proportions) | 39% |
| Polyisoprene: | |
| Mooney viscosity (ML-4) | 60 |
| Defo | 2500/31 |
| Gel content | <2% |
| cis-1,4-Content | 90% |
| 3,4-Content | 10% |

120 Kg. of the polyisoprene solution is dispersed in 112 kg. of water at a pH of 11.5 with the aid of an emulsifying device of the type "Supraton 455 D" in the presence of 0.72 kg. of laurylamine polyglycol ether with 12 ethoxy units, 0.048 kg. of a sodium polyacrylate by the Rohm company (product name "Plex 5367 F"), and 0.06 kg. of a methylcellulose by Wolff Walsrode AG. (trade name "MC 20,000 S"). The pH is adjusted by adding sodium hydroxide solution.

In another batch, 280 kg. of the polybutadiene solution is dispersed in water at a pH of 11.5 with the aid of an emulsifier device of the type "Supraton 455 D" in the presence of 1.68 kg. of laurylamine polyglycol ether with 12 ethoxy units, 0.056 kg. of a sodium polyacrylate of the company Rohm (product name "Plex 5367 F"), and 0.14 kg. of a methylcellulose by Wolff Walsrode AG. (trade name "MC 20,000 S"). The pH is adjusted by adding sodium hydroxide solution.

The aqueous stable emulsion of the polybutadiene solution is combined with the aqueous stable emulsion of the polyisoprene solution to form a stable and homogeneous mixture. Under agitation, this mixture is combined successively with 18.5 kg. of a 26% aqueous sodium silicate solution and 240 kg. of an aqueous dispersion of 12 kg. of FEF black, corresponding to 30 parts by weight of carbon black per 100 parts by weight of total elastomer, in 227 kg. of water containing 0.12 kg. of laurylamine polyglycol ether with 12 ethoxy units.

The stable and homogeneous, aqueous mixture of the emulsions of the elastomer solutions, the sodium silicate solution, and the carbon black dispersion is stirred into an aqueous precipitation bath consisting of a mixture of 500 kg. of water and 40 kg. of a 10% sulfuric acid, heated to 90° C. While the hexane is distilled off, the carbon-black-containing elastomer premix is precipitated in finely divided form (first stage).

After the hexane has been completely removed by gasification, the pH of the aqueous suspension of the premix is set to 6.7 by the addition of sodium hydroxide solution (second stage).

Another 8 kg. of FEF black, corresponding to 20 parts by weight of carbon black per 100 parts by weight of elastomer, is stirred as a suspension in 160 kg. of water into this aqueous suspension of finely divided, carbon-black-containing elastomer premix and silicic acid (third stage).

The thus-obtained, finely divided basic elastomer mixture is separated from the water and then dried under constant agitation, thus obtaining a pulverulent, pourable basic elastomer mixture.

EXAMPLE 8

(Comparative Example 4)

Example 7 is repeated except for the following modifications:

a. The FEF black, 50 parts by weight per 100 parts by weight of total elastomer, is stirred immediately and quantitatively into the emulsion mixture of the two elastomer solutions, rather than being added stepwise as in Example 7;

b. the pH of the aqueous precipitate slurry is set to 6.5 by adding sodium hydroxide solution only after the precipitation of the entire basic elastomer mixture.

The powdery basic elastomer mixture according to Example 7 (process of the present invention) has a clearly higher bulk density and exhibits substantially better pouring properties than the powder mixture according to Example 8 (see Table 4).

TABLE 4

| Basic Elastomer Mixture | Pourability Test sec. | Bulk Density g./l. |
|---|---|---|
| Example 7 | 11.0 | 406 |
| Example 8 | 28.2 (*) | 324 |

(*) The product can be poured only after tapping the test beaker.

EXAMPLE 9

A copolymer of butadiene with styrene (SBR 1500), prepared by emulsion polymerization, is utilized as the elastomer in the form of the aqueous latex.

The elastomer and its latex have the following data:

| Mooney viscosity (ML-4) | 50 |
|---|---|
| Defo | 750/32 |
| Gel content | 2% |
| Styrene content | 23.5% |
| trans-1,2-Content | 20% |
| trans-1,4-Content | 72% |
| Solids content of the latex | 23.5% |
| Emulsifier (alkali salt of a rosin acid: "DRESINATE 731") | 7.0% |

Under agitation, 320 kg. of a 7.5% aqueous ISAF black dispersion is introduced into 340 kg. of this SBR latex (the ISAF black dispersion containing 30 parts by weight of carbon black per 100 parts by weight of elastomer). The carbon black dispersion is prepared from 295 kg. of water, 24 kg. of ISAF black, 0.88 kg. of a laurylamine polyglycol ether with 10 ethoxy units and 0.12 kg. of a high-molecular methylcellulose (trade name "MC 20,000 S"). Under thorough stirring, a homogeneous and stable latex-carbon black mixture is thus obtained.

This homogeneous mixture is introduced under vigorous agitation into an aqueous precipitating bath prepared from 31 kg. 20% sodium silicate solution, 70 kg. of 10% sulfuric acid, and 399 kg. of water, heated to about 60°–95° C.; the elastomer premix is thus precipitated (first stage).

In the second stage, the aqueous suspension of the elastomer premix is neutralized.

Thereafter, the residual quantity of carbon black (16 kg. corresponding to 20 parts by weight, based on 100 parts by weight of elastomer) is stirred into the suspension consisting of elastomer premix and silicic acid, this residual quantity being in the form of a 5% aqueous suspension prepared without the addition of dispersing agents (third stage).

A basic elastomer mixture is obtained in this way, which is separated from the water and dried into a pourable powder under constant agitation.

The bulk density is 505 g./l.; the pouring time is 17.0 seconds.

EXAMPLE 10

The elastomer employed is a copolymer of butadiene and styrene (basic polymer for SBR 1712), produced by emulsion polymerization, in the form of its aqueous latex. The elastomer and its latex have the following data:

| Mooney viscosity (ML-4) | 116 |
|---|---|
| Defo | 1750/45 |
| Gel content | 2% |
| Styrene content | 23.5% |
| trans-1,2-Content | 20% |
| trans-1,4-Content | 72% |
| Content of 1,4-units | 8% |
| Solids content of the latex | 24.6% |
| Emulsifier (mixture of alkali salts of rosin acids and fatty acids) | 7.0% |

Under agitation, 467 kg. of a 7.5% aqueous carbon black dispersion is introduced into 285 kg. of this SBR latex, corresponding to 50 parts by weight of carbon black to 100 parts by weight of elastomer. The carbon black dispersion is prepared from 488 kg. of water, 45 kg. of ISAF black, 0.90 kg. of laurylamine polyglycol ether with 12 ethoxy units, and 0.2 kg. of a high-molecular sodium polyacrylate by the Rohm company (product name "Plex 5367 F"). A stable, homogeneous mixture is produced from latex and carbon black dispersion; under agitation, this mixture is introduced into an aqueous precipitation bath heated to about 60°–95° C. The precipitation bath consists of 400 kg. of water, 60 kg. of 10% sulfuric acid, and 26.9 kg. of 26% sodium silicate solution. The elastomer premix is precipitated in finely divided form (first stage).

The suspension of the premix is neutralized in the second stage with the aid of 10% sodium hydroxide solution.

Thereafter, the residual amount of ISAF black, namely 14 kg. (20 parts by weight of carbon black per 100 parts by weight of elastomer) is stirred into the aqueous suspension consisting of the elastomer premix and precipitated silicic acid in the form of a 5% suspension in water, produced without the addition of emulsifiers or surface-active substances (third stage).

After separating the water and drying under constant agitation, a powdery, pourable basic elastomer mixture is thus obtained.

The bulk density is 484 g./l., the pouring time is measured as 18.2 seconds.

EXAMPLE 11

The elastomer employed is a copolymer of ethylene, propylene, and ethylidene norbornene in the form of its 10% solution in hexane. The elastomer has the following data:

| Mooney viscosity (ML-4) | 110 |
|---|---|
| Defo | 1275/30 |
| Gel content | 2% |
| Number of double bonds | 8/1000 carbon atoms |
| Tercomponent | ethylidene norbornene |
| Propylene content | 45% |

With the aid of an emulsifying device of the type "Supraton 455 D" 400 kg. of this elastomer solution is dispersed in 380 kg. of water at a pH of 11.5 in the presence of 2.397 kg. of potassium oleate, 0.16 kg. of a polyacrylate by Rohm (product name "Plex 5367 F"), and 0.32 kg. of a high-molecular methylcellulose by Wolff Walsrode AG. (trade name "MC 20,000 S"). The pH is adjusted by adding sodium hydroxide solution.

The aqueous, stable emulsion of the elastomer solution is combined with 15.44 kg. of 26% aqueous sodium silicate solution and 240 kg. of an aqueous carbon black suspension containing 13 kg. of FEF black — corresponding to 30 parts by weight per 100 parts by weight of elastomer. The stable mixture is introduced into an aqueous precipitation bath consisting of a mixture of 478 kg. of water and 22 kg. of 10% sulfuric acid, heated to about 90° C. While the hexane is distilled off, the carbon-black-containing elastomer premix is precipitated in finely divided form (first stage).

After the hexane has been removed by gasifying, 400 g. of laurylamine polyglycol ether is stirred into the mixture, and the pH of the aqueous suspension of the premix is set, at 80°–90° C., to 6.5 by adding sodium hydroxide solution (second stage).

After changing the pH, another 7 kg. of FEF black, corresponding to 20 parts by weight of carbon black per 100 parts by weight of elastomer, is added under agitation as a suspension in 150 kg. of water (third stage).

The thus-precipitated, finely divided basic elastomer mixture is separated from the water and then dried under constant agitation, yielding a pulverulent, pourable basic elastomer mixture.

EXAMPLE 12

(Comparative Example 5)

Example 11 is repeated with the following modifications:

a. The FEF black, in total 50 parts by weight per 100 parts by weight of elastomer, is stirred immediately and quantitatively into the aqueous emulsion of the elastomer solution, rather than stepwise as described in Example 11;

b. the pH of the aqueous suspension of precipitate is adjusted to 6.6 by adding sodium hydroxide solution only after the precipitation of the basic elastomer mixture containing the entire amount of carbon black.

The powdery basic elastomer mixture according to Example 11 (process of this invention) has a higher bulk density and better pouring characteristics than the pulverulent basic mixture according to Example 12 (see Table 5).

TABLE 5

| Basic Elastomer Mixture | Pourability Test sec. | Bulk Density g./l. |
|---|---|---|
| Example 11 | 22.6 | 347 |
| Example 12 | 27.6 (*) | 298 |

(*) The product can be poured only after tapping the test beaker.

EXAMPLE 13

The elastomer is a polybutadiene obtained by the adiabatic polymerization of butadiene in the presence of nbutyllithium, as a 12.4% solution in hexane. The rubber has the following analytical data:

| Mooney viscosity (ML-4) | 74 |
|---|---|
| Defo | 1025/33 |
| trans-1,4-Content | 39% |
| cis-1,4-Content | 27% |
| Vinyl group content (1,2-units) | 34% |
| Viscosity of solution at 20°C. | 885 cp. |

289 Kg. of this polybutadiene solution is dispersed in 285 kg. of water with the aid of an emulsifying device of the type "Supraton 455 D" in the presence of 0.866 kg. of cetyltrimethylammonium chloride. The pH of the emulsion is set to 3.5.

Under agitation, 500 kg. of a dispersion of 50 kg. of highly active silicic acid by Degussa (trade name "Ultrasil VN 3") — corresponding to 47 parts by weight of silicic acid per 100 parts of elastomer — in water containing 0.5 kg. of cetyltrimethylammonium chloride is stirred into the stable emulsion of the elastomer solution.

The stable and homogeneous mixture of the aqueous emulsion of the elastomer solution and the aqueous dispersion of the silicic acid is stirred into an aqueous precipitation bath consisting of a mixture of 300 kg. of water and 15 kg. of 26% sodium silicate solution ($SiO_2$ content: 3.9 kg.), heated to about 90° C. While the hexane is distilled off, the elastomer premix, which contains silicic acid, is precipitated in finely divided form (first stage).

After the hexane has been removed by evaporation, the pH of the aqueous suspension of the elastomer premix is set to 6.8 (second stage).

Under agitation, another 250 kg. of a silicic acid suspension consisting of 225 kg. of water and 25 kg. of "Ultrasil VN 3" which corresponds to 23 parts by weight of silicic acid per 100 parts by weight of elastomer, is added to the above suspension (third stage).

The thus-obtained, light-colored basic rubber mixture is separated from the water and then dried under constant agitation. A pulverulent, pourable basic elastomer mixture is thus obtained.

EXAMPLE 14

(Comparative Example 6)

Example 13 is repeated with the following modifications:

a. The silicic acid, 70 parts by weight per 100 parts by weight of elastomer, is stirred immediately and quantitatively into the aqueous emulsion of the elastomer solution, rather than stepwise as set forth in Example 16;

b. no sodium silicate is added;

c. the pH of the aqueous precipitate suspension is set to 6.8 only after the basic elastomer mixture containing the entire amount of silicic acid has been precipitated.

The powdery, light-colored basic elastomer mixture according to Example 13 (process of the present invention) has a higher bulk density and better pouring properties than the basic mixture according to Example 14 (see Table 6).

TABLE 6

| Basic Elastomer Mixture | Pourability Test sec. | Bulk Density g./l. |
|---|---|---|
| Example 13 | 17.8 | 455 |
| Example 14 | 25.0 | 386 |

EXAMPLE 15 a. A polybutadiene obtained by the adiabatic polymerization of butadiene in the presence of n-butyllithium is used as the elastomer as a 10% solution in hexane. The elastomer has the following analytical data:

| Mooney viscosity (ML-4) | 78 |
|---|---|
| Defo | 755/31 |
| Gel content | <2% |
| trans-1,4-Content | 41% |
| cis-1,4-Content | 25% |
| Vinyl group content (1,2-units) | 34% | b. The filler employed is, inter alia, an HAF black containing plasticizer oil. This carbon black is prepared as follows:

A Henschel mixer having a capacity of 30 liters is filled with 3 kg. of HAF black at a wall temperature of 20°-50° C. After the rotor has been started up with a speed of 1,600 r.p.m., 1.764 kg. of plasticizer oil (trade name "Naftolen MV"), previously preheated to 60°-80° C., is introduced within 3 minutes in finely divided form through an inlet opening provided with fine bores. After the plasticizer oil has been added, the rotor is allowed to run another 2 minutes to complete the distribution. After a total mixing time of 5 minutes, the carbon blackplasticizer oil mixture is present in the dustfine distribution inherent in carbon black without any impairment of the pourability and without any tendency toward caking.

c. To produce an aqueous dispersion of the aforedescribed HAF black, containing plasticizer oil, 50.4 kg. of a plasticizer-oil-containing HAF black is dispersed in 200.5 kg. of water during a time of 30 minutes with the aid of an emulsifying device of the type "Supraton 455 D." The water contains 1.5 kg. of laurylamine polyglycol ether with 12 ethoxy units and 1 kg. of 10% sodium hydroxide solution. A 20% strength, stable, plasticizer-oil-containing carbon black dispersion in water is thus obtained.

d. The rubber solution described under (a) is converted into a stable aqueous emulsion as follows:

372.5 Kg. of the polybutadiene solution described under (a) is emulsified in 370 kg. of water with the aid of an emulsifying device "Supraton 455 D" in the presence of 2.235 kg. of laurylamine polyglycol ether with 12 ethoxy groups. The pH is set to 11.5 by adding sodium hydroxide solution, thus obtaining a thinly fluid, stable emulsion.

e. The stable aqueous emulsion of the elastomer solution prepared according to (d) (744.7 kg.) is mixed together with 150 kg. of the aqueous dispersion of the plasticizer oil-containing HAF carbon black obtained according to (c) under simple agitation. The mixture contains 50 parts by weight of carbon black and 30 parts by weight of plasticizer oil per 100 parts by weight of elastomer. Additionally, this stable and homogeneous mixture is combined under stirring with 7.75 kg. of a 26% sodium silicate solution, the $SiO_2$ content of which is 2.02 kg.

The stable aqueous mixture of the emulsion of the elastomer solution, the dispersion of the plasticizer-oil-containing carbon black, and of the sodium silicate is stirred into an aqueous precipitation bath having a temperature of about 90° C. and containing such an amount of sulfuric acid that the pH is between 1.5 and 2.0. While the solvent, hexane, is removed by distillation, the elastomer premix, which contains plasticizer oil and carbon black, is precipitated in finely divided form. The pH value of the aqueous phase is maintained at between 1.5 and 2.5 during the entire precipitation step (first stage).

After the premix has been precipitated, the pH is set to 6.5–7.0 by adding sodium hydroxide solution at the precipitation temperature of 90° C. The silicic acid introduced into the batch by the sodium silicate solution is now condensed to water-insoluble silicic acid (second stage).

A slurry of 11.2 kg. of HAF black in 120 kg. of water is introduced into the aqueous slurry of the elastomer premix, containing plasticizer oil and carbon black, and precipitated silicic acid (third stage).

Thereafter, the finished basic elastomer mixture is separated from the water and dried under constant agitation, thus obtaining a powdery, well pourable basic elastomer mixture containing plasticizer oil and carbon black.

EXAMPLE 16

(Comparative Example 7)

Example 15 is repeated, except for the following changes:

a. The HAF block, in total 80 parts by weight per 100 parts by weight of elastomer, is introduced immediately and quantitatively into the emulsion of the elastomer solution, rather than in two portions. The procedure followed in this connection is to disperse the carbon black which contains plasticizer oil and the carbon black which is free of plasticizer oil together in water;

b. no sodium silicate is added;

c. the neutralization is conducted only after precipitating the entire basic elastomer mixture.

The powdery basic elastomer mixture, containing plasticizer oil and carbon black, according to Example 15 (process of this invention) has higher bulk densities and better pouring properties than the elastomer mixture according to Example 16 (see Table 7).

TABLE 7

| Basic Elastomer Mixture | Pourability Test sec. | Bulk Density g./l. |
|---|---|---|
| Example 15 | 31.6 | 480 |
| Example 16 | Product can be poured only intermittently after tapping the test beaker | 370 |

EXAMPLE 17

The elastomer used is a copolymer prepared by solution polymerization of butadiene and styrene in the presence of n-butyllithium as the catalyst, in the form of a 20% solution thereof in hexane. The copolymer has the following analytical data.

| Mooney viscosity (ML-4) | 76 |
|---|---|
| Styrene content | 20% |
| Butadiene content | 80% |
| Gel content | 2% |
| trans-1,4-Content | 37% |
| cis-1,4-Content | 34% |
| Vinyl groups (1,2-content) | 9% |
| Block styrene content | 3.2% |
| Solution viscosity | 22,000 cp. |

200 Kg. of this elastomer solution is emulsified in 225 kg. of water with the aid of an emulsifying device of the type "Supraton 455 D" in the presence of 2.4 kg. of a laurylamine polygonal ether with 12 ethoxy units, 0.16 kg. of a sodium polyacrylate by Rohm (product name "Plex 5367 F"), and 0.32 kg. of a methylcellulose by Wolff Walsrode AG. (trade name "MC 20,000 S"). The pH is set to 11.5 by adding sodium hydroxide solution.

This stable aqueous emulsion of the elastomer solution is mixed under simple agitation with 400 kg. of an ISAF black suspension consisting of 20 kg. of ISAF black, corresponding to 50 parts by weight of carbon black per 100 parts by weight of elastomer, and 380 kg. of water.

The stable and homogeneous, aqeueous mixture of the emulsion of the elastomer solution and the carbon black suspension is stirred into an aqueous precipitation bath consisting of a mixture of 250 kg. of water, 34 kg. of 10% sulfuric acid, and 800 g. of 26% sodium silicate solution. While the solvent, hexane, distilled off, the elastomer premix containing the carbon black is precipitated in finely divided form. The pH of the aqueous phase is held at 1.5–2.5 during the precipitation step (first stage).

After the precipitating process is finished and the hexane has been driven off, the pH of the aqueous phase is set to 6.5–7 by adding sodium hydroxide solution (second stage).

At this point, another 280 kg. of an aqueous ISAF black suspension, containing 14 kg. of ISAF black corresponding to 35 parts by weight of carbon black per 100 parts by weight of elastomer, is added to the aqueous suspension of the carbon-black-containing elastomer premix (third stage).

The basic elastomer mixture, finished after this process step, is separated from the water and dried under constant agitation, yielding the basic elasomer mixture in the form of a pourable powder.

EXAMPLE 18

(Comparative Example 8)

Example 17 is repeated, except for the following modifications:

a. The entire amount of ISAF black, 85 parts by weight per 100 parts by weight of elastomer, is stirred quantitatively without fractionation into the aqueous emulsion of the elastomer solution prior to neutralization and prior to precipitation;

b. no sodium silicate is added.

The pulverulent basic elastomer mixture of Example 17 (process of the present invention) exhibits a markedly increased bulk density and better pourability test values than the mixture according to Example 18 (see Table 8).

TABLE 8

| Basic Elastomer Mixture | Pourability Test sec. | Bulk Density g./l. |
|---|---|---|
| Example 17 | 21.2 | 405 |
| Example 18 | 28.4 | 310 |

EXAMPLE 19

A polyoctenamer obtained by the ring-opening polymerization (metathesis reaction) of cyclooctene is used as the elastomer in the form of a 36% solution thereof in hexane.

| The polymer has the following analytic data: | |
|---|---|
| Gel content | <1% |
| trans-Content | 65% |
| cis-Content | 35% |
| Viscosity (RSV) | 1.5 |
| Viscosity of solution about 25,000 cp. | |

With the aid of an emulsifying device of the type "Supraton 455 D," 150 kg. of this polyoctenamer solution is emulsified in 148.35 kg. of water in the presence of 0.9 kg. of laurylamine polyglycol ether, 0.375 kg. of a sodium polyacrylate by Rohm (product name "Plex 5367 F"), and 0.375 kg. of a high-molecular methylcellulose by Wolff Walsrode AG. (trade name "MC 20,000 S"). The pH is set to 11.5 by the addition of sodium hydroxide solution.

Under agitation, 1,200 kg. of such an aqueous emulsion of the polyoctenamer solution, containing 216 kg. of elastomer, is mixed with 1,081.08 kg. of an aqueous HAF black dispersion containing 108 kg. of HAF black and 1.08 kg. of laurylamine polyglycol ether, corresponding to 50 parts by weight of carbon black per 100 parts by weight of polyoctenamer. Additionally, 20 kg. of a 26% sodium silicate solution (SiO$_2$ content: 5.2 kg. = 2.4% by weight, based on the elastomer) is stirred into the stable mixture.

The stable and homogeneous aqueous mixture of the emulsion of the polyoctenamer solution, the carbon black dispersion, and the sodium silicate solution is stirred into an aqueous precipitation bath, heated to 90° C., the pH of which is maintained constantly between 1.5 and 2.5 with the aid of sulfuric acid. While the solvent, hexane, is distilled off, the elastomer premix, containing carbon black, is precipitated in finely divided form (first stage).

After the precipitating step is terminated, the pH of the aqueous precipitation bath is set to 7.0 by adding sodium hydroxide solution (second stage).

Another 20 parts by weight of carbon black per 100 parts by weight of polyoctenamer is stirred into the aqueous suspension of finely divided elastomer premix and precipitated silicic acid, in the form of 432 kg. of an aqueous HAF black suspension containing 43.2 kg. of HAF black (third stage).

Subsequently the finished basic elastomer mixture is separated from the water and dried under constant agitation, thus obtaining a powdery, readily pourable basic elastomer mixture.

EXAMPLE 20

(Comparative Example 9)

Example 19 is repeated, except for the following modifications:

a. The 70 parts of total HAF carbon black are stirred quantitatively into the emulsion of the elastomer solution;

b. the charge is neutralized only after the quantitative precipitation of the basic elastomer mixture containing the entire amount of carbon black.

The pulverulent basic rubber mixture according to Example 19 (process of this invention) has, as compared to the product of Example 20, not only as increased bulk density, but also a clearly improved fluidity (see Table 9).

TABLE 9

| Basic Elastomer Mixture | Pourability Test sec. | Bulk Density g./l. |
|---|---|---|
| Example 19 | 15.8 | 465 |
| Example 20 | Does not pour out uniformly but in spurts. Times cannot be reproduced. | 370 |

EXAMPLE 21

The elastomer employed is a cis-1,4-polybutadiene (trade name "BUNA CB 10"), prepared by Ziegler polymerization of butadiene in benzene, in the form of a 12% solution thereof in hexane as obtained after the polymerization. The cis-1,4-polybutadiene has the following analytical data:

| Mooney viscosity (ML-4) | 47 |
|---|---|
| Defo | 700/36 |
| Gel content | <2% |
| cis-1,4-Content | 97% |
| trans-1,4-Content | 2% |
| 1,2-Content | 1% |
| Viscosity of solution | 2500 cp. |

With the aid of an emulsifying device of the type "Supraton 455 D," 200 kg. of this polybutadiene solution is emulsified in 198 kg. of water containing 1.2 kg. of potassium oleate and 0.8 kg. of a sodium polyacrylate by Rohm (product name "Plex 5367 F"). The pH of the emulsion is set to 11.5 by adding sodium hydroxide solution. The emulsion is stable and miscible with water in any proportion.

By means of simple agitation, 200 kg. of this stable aqueous emulsion of the cis-1,4-polybutadiene solution is mixed with 292.2 kg. of an aqueous ISAF black dispersion prepared by dispersing 15.6 kg. of ISAF black in the presence of 0.465 kg. of laurylamine polyglycol ether, 0.0783 kg. of sodium polyacrylate by Rohm (product name "Plex 5367 F"), and 0.0783 kg. of methylcellulose by Wolff Walsrode AG. (trade name "MC 20,000 S") in 294.3 kg. of water.

The mixture of emulsion and carbon black dispersion, containing 65 parts by weight of carbon black per 100 parts by weight of elastomer, is stirred into an aqueous precipitating bath consisting of a mixture of 137.3 kg. of water, 20 kg. of 10% sulfuric acid, and 9.23 kg. of a 26% sodium silicate solution, heated to 90° C. While the solvent, benzene, is removed by distillation, the elastomer premix is precipitated in finely divided form (first stage).

After the elastomer premix has been completely precipitated, the acidic, aqueous suspension thereof is adjusted to pH 6.9 by the addition of sodium hydroxide solution (second stage).

After neutralization, the batch is mixed under agitation with another 96 kg. of a 5% ISAF black suspension, corresponding to 20 parts by weight of carbon black per 100 parts by weight of elastomer (third stage).

The thus-produced, very fine-particulate basic elastomer mixture is separated from the water by decanting and dried in a pan dryer under constant agitation. A pulverulent, pourable cis-1,4-polybutadiene basic mixture is thus obtained. The bulk density is 417 g./l. The pouring velocity is measured as 18.4 seconds.

EXAMPLE 22

An emulsion polymer of butadiene and styrene in the form of its aqueous latex is employed as the elastomer. The elastomer and its latex have the following data:

| | |
|---|---|
| Mooney viscosity (ML-4) | 116 |
| Defo | 1750/45 |
| Gel content | 2% |
| Styrene content | 23.5% |
| trans-1,2-Content | 20% |
| trans-1,4-Content | 72% |
| cis-1,4-Content | 8% |
| Solids content of latex | 24.6% |
| Emulsifier (mixture of alkali salts of rosin acids and fatty acids) | |

Under agitation, 280 kg. of a 25% SBR latex of the above quality is combined with 700 kg. of an aqueous carbon black dispersion, consisting of 640.5 kg. of water, 35 kg. of ISAF black (50 p.p.h.r. [parts per hundred parts of rubber]), 7 kg. of a 10% laurylamine polyglycol ether solution, and 17.5 kg. of a 1% sodium polyacrylate solution. A stable, homogeneous mixture is prepared from the SBR latex and the carbon black dispersion, and this mixture is introduced under stirring into an aqueous precipitation bath heated to about 80°-95° C. The precipitation bath consists of 928 kg. of water, 45 kg. of 10% sulfuric acid, and 13.5 kg. of 26% sodium silicate solution (5 p.p.h.r. SiO$_2$). The elastomer premix is precipitated in finely divided form (first stage).

In the second stage, the aqueous suspension of the premix is neutralized with 10% sodium hydroxide solution (pH 6.8), whereupon 9.7 kg. of a 10% alum solution is added thereto under agitation (alum = K$_2$Al$_2$(SO$_4$)$_4$ × 24 H$_2$O).

In the third stage, 280 kg. of a 5% aqueous ISAF black suspension (corresponding to 20 p.p.h.r. ISAF black) is stirred into the aqueous suspension of the finely divided elastomer premix and aluminum silicate.

Thereafter, the finished basic elastomer mixture is separated from the water and dried under constant agitation, thus obtaining a powdery, pourable SBR basic mixture, the bulk density of which is 487 g./l. The pourability test yielded 14.2 seconds.

EXAMPLE 23

As the elastomer, a cis-1,4-polyisoprene obtained by Ziegler polymerization is utilized in the form of its solution in hexane. The elastomer and its solution have the following data:

| | |
|---|---|
| Mooney viscosity (ML-4) | 76 |
| Defo | 1260/25 |
| Gel content | 21% |
| cis-1,4-Content | 96% |
| 3,4-Content | 3% |
| Solvent | hexane |
| Solids content of solution | 9% |
| Viscosity of solution | 1400 cp. |

With the aid of an emulsifying machine, 700 kg. of this 9% cis-1,4-polyisoprene solution is dispersed in 695 kg. of water at a pH of 11.5 in the presence of 4.2 kg. of laurylamine polyglycol ether, 0.28 kg. of sodium polyacrylate by Rohm (product name "Plex 5367 F"), and 0.56 kg. of a methylcellulose by Wolff Walsrode AG. (trade name "MC 20,000 S"). The stable emulsion of the elastomer solution is combined under stirring with 12.1 kg. of a 26% sodium silicate solution (SiO$_2$ content: 5 p.p.h.r.) and 629.65 kg. of an aqueous carbon black dispersion containing 31.5 kg. of ISAF black (corresponding to 50 p.p.h.r.) and 3.15 kg. of laurylamine polyglycol ether.

The thus-produced stable mixture is introduced into an aqueous precipitation bath consisting of a mixture, heated to 70°-80° C., of 465 kg. of water and 35.2 kg. of 10% sulfuric acid. While the hexane is distilled off, the elastomer premix, containing the carbon black, is precipitated in finely divided form (first stage).

The pH of the aqueous suspension of the premix is adjusted to 6.5 by adding sodium hydroxide solution. Then, 167 kg. of a 10% aqueous solution of aluminum sulfate [Al$_2$(SO$_4$)$_3$ × 18 H$_2$0] is stirred into the suspension. The temperature is 80°-90° C. (second stage).

In the third stage, 252 kg. of a 5% ISAF black suspension (20 p.p.h.r. of carbon black) is added to the suspension under agitation at about 90°-90° C.

The unusually finely divided, pulverulent basic elastomer mixture obtained after carrying out the three-stage precipitation step is separated from the water and dried under constant circulation. A powdery, pourable cis-1,4-polyisoprene basic mixture is thus obtained. The pourability test yields 24.8 seconds. The bulk density is 300 g./l.

EXAMPLE 24

The elastomer employed is an EPDM type which can be characterized by the following data:

| | |
|---|---|
| Mooney viscosity (ML-4) | 88 |
| Defo | 1225/37 |
| Gel content | <2% |
| Tercomponent | ethylidene-norbornene |
| C = C/1000 C | 13-14 |
| Propylene content | 48% |
| Ethylene content | 52% |

| | |
|---|---|
| Solvent | hexane |
| Solids content of solution | 10% |
| Viscosity of solution | 460 cp. |

With the aid of 600 kg. of water, 3.6 kg. of laurylamine polyglycol ether, and 0.24 kg. of sodium polyacrylate by Rohm (product name "Plex 5367 F"), 600 kg. of this EPDM solution is converted into a stable aqueous emulsion in an emulsifying device. The pH of the emulsion is 11.5. Under agitation, this emulsion is combined with 11.5 kg. of a 26% sodium silicate solution (5 p.p.h.r. $SiO_2$) and 840.2 kg. of an aqueous FEF black dispersion consisting of 794 kg. of water, 42 kg. of FEF black, and 4.2 kg. of a 10% laurylamine polyglycol ether solution.

The stable and homogeneous mixture of elastomer emulsion and carbon black dispersion is stirred into a precipitation bath consisting of a mixture of 464 kg. of water and 36 kg. of 10% sulfuric acid. The temperature of the precipitation bath is between 75° and 85° C. While the elastomer premix is precipitated in an inordinately finely divided form, the solvent, hexane, is removed by distillation (first stage).

In the second stage, the pH of the aqueous suspension of the elastomer premix is adjusted, at temperatures of 80°-90° C., to pH 6.5 while simultaneously adding 167 kg. of a 10% aqueous solution of aluminum sulfate $[Al_2(SO_4)_3 \times 18\ H_2O]$. In a third stage, at temperatures of 90°-95° C., 240 kg. of a 5% aqueous FEF black suspension is stirred into the batch, thus producing the pulverulent basic elastomer mixture.

The basic mixture is separated from the water and dried under constant agitation, thus obtaining the EPDM basic mixture as a freely flowing powder having a bulk density of 307 g./l. The pourability test yields 24.6 seconds.

EXAMPLE 25

The elastomer utilized is an EPDM type which can be characterized by the following data:

| | |
|---|---|
| Mooney viscosity (ML-4) | 31 |
| Defo | 500/24 |
| Gel content | <2% |
| Polymer green tensile strength | 50 kg./cm² |
| Tercomponent | ethylidene-norbornene |
| C = C/1000 C | 8 |
| Propylene content | 30% |
| Ethylene content | 70% |
| Solvent | hexane |
| Solids content of solution | 10% |
| Viscosity of solution | 175 cp. |

With the aid of an emulsifying device, 600 kg. of this EPDM solution is emulsified in 550 kg. of water containing as emulsifying adjuvants 3.6 kg. of potassium oleate, 0.24 kg. of sodium polyacrylate by Rohm (product name "Plex 5367F"), and 0.48 kg. of a methylcellulose by Wolff Walsrode AG. (trade name "MC 20,000 S"). The stable emulsion of the elastomer solution has a pH of 11.5. This aqueous emulsion is combined under agitation with 11.5 kg. of a 26% sodium silicate solution (5 p.p.h.r. $SiO_2$) and with an aqueous SRF black dispersion prepared from 1,201 kg. of water, 66 kg. of SRF black, 0.635 kg. of laurylamine polyglycol ether, and 0.33 kg. of a sodium polyacrylate by Rohm (product name "Plex 5367 F").

The stable and homogeneous mixture of elastomer solution emulsion and carbon black dispersion is introduced into a precipitation bath, heated to 75°-85° C., consisting of a mixture of 460 kg. of water and 40 kg. of 10% sulfuric acid. While the elastomer premix is precipitated in finely divided form, the solvent, hexane, is distilled off (first stage).

In the second stage, the pH of the aqueous suspension of the elastomer premix is adjusted from 2.3 to 6.5 at temperatures of 80°-90° C. and simultaneously 33.4 kg. of a 10% aluminum sulfate solution $[Al_2(SO_4)_3 \times 18\ H_2O]$ is added under agitation.

In the third stage, 240 kg. of a 5% suspension of an SRF black having a temperature range of 85°-95° C. is then introduced under stirring at temperatures of 90-95° C.

The finished basic EPDM mixture is separated from the water and dried at 40° C. under a pressure of 20 torr [mm. Hg] under constant movement. A powder is thus obtained having a bulk density of 253 g./l. The pouring test yields a value of 38.7 seconds.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spririt and scope thereof, can make various changes and modifications of the invention to adapt it to various usages and conditions.

What is claimed is:

1. In a process for the production of pulverulent, tack-free, pourable, filler-containing elastomer particles by preceipitating a stable, emulsified, homogeneous mixture of an aqueous elastomer emulsion and an aqueous dispersion of a solid filler for said elastomer in the presence of sufficient sodium silicate to form an aqueous suspension of the precipitated elastomer and the filler, the improvement which comprises:
   a. precipitating the silicic acid in the aqueous suspension at a pH of 4.0 to 9.0 in the presence of 50-99% of the total amount of filler added to form said filler-containing elasmer particles, and then
   b. mixing the thus-produced suspension of elastomer, filler and precipitated silicic acid with additional filler in the form of an emulsifier-free aqueous suspension.

2. A process according to claim 1 wherein the elastomer is in the form of a solution in a volatile inert organic solvent and the elastomer is precipitated by volatilization of the solvent.

3. A process according to claim 2 wherein the elastomer is at least one solution polymerized elastomer selected from the group consisting of polybutadiene, polyisoprene, copolymers of butadiene and styrene, EPM and EPDM copolymers and polyalkenamers prepared by ring-opening polymerization of cycloolefins.

4. A process according to claim 3 wherein the elastomer is an EPDM copolymer of ethylene, propylene and at least one unconjugated diene.

5. A process according to claim 1 wherein the elastomer is an aqueous latex.

6. A process according to claim 5 wherein said elastomer is a copolymer or butadiene and styrene or acrylonitrile.

7. A process according to claim 1 wherein said silicic acid is precipitated by adding 1-50% by weight, based on the $SiO_2$, of at least one water-soluble salt which forms insoluble or poorly soluble salts with alkali metal silicates to precipitate substantially all of the dissolved silicic acid from said admixture.

8. A process according to claim 7 wherein said water-soluble salt is of a metal from Main (A) Groups II or III or Subgroups (B Groups) II or VIII of the Periodic Table.

9. A process according to claim 8 wherein said water-soluble salt is an aluminum salt.

10. A process according to claim 9 wherein said aluminum salt is aluminum chloride or aluminum sulfate.

11. A process according to claim 1 wherein said sodium silicate is present in the mixture of elastomers and filler prior to the precipitation thereof.

12. A process according to claim 1 wherein said silicic acid is precipitated by adding 1-50% by weight, based on the $SiO_2$, of at least one silicic acid precipitating, water-soluble amine selected from the group consisting of secondary amines, tertiary amines and quaternary ammonium salts.

13. A process according to claim 12 wherein said amine is a condensation product of aliphatic amines with lower alkylene oxides.

14. A process according to claim 13 wherein said lower alkylene oxides are ethylene oxide and propylene oxide.

15. A process according to claim 14 wherein said aliphatic amine is at least one member selected from the group consisting of cocosamine, oleylamine, stearylamine, laurylamine and trimethylhexamethylenediamine.

16. A process according to claim 15 wherein 5-20% by weight of said amine, based on the $SiO_2$, is added to precipitate said silicic acid.

17. A process according to claim 1 wherein the starting stable, emulsified homogeneous mixture comprises a dispersion of carbon black, an emulsifying amount of an alkylamine oxyalkylate surfactant and an emulsion stabilizing amount of a water-soluble methylcellulose or alkali metal polyacrylate.

18. A process according to claim 1 wherein the thus-produced filler-containing elastomer particles contain 40-110% by weight, based on the elastomer, of carbon black.

19. In a process for preparing a pulverulent, tack-free, pourable, filler-containing elastomer mixture by admixing an elastomer latex or a stable aqueous emulsion of elastomer dissolved in a solvent with an aqueous dispersion or suspension of solid elastomer filler to form a stable, homogeneous admixture thereof; precipitating said stable admixture by introducing said admixture into water which contains elastomer precipitants; separating the thus-precipitated filler-containing elastomer mixture from the water; and drying this mixture under constant agitation, the improvement which comprises:
  a. combining said elastomer latex or stable aqueous emulsion of elastomer with less than the intended total amount of filler to form said stable, homogeneous admixture;
  b. mixing the resultant stable, homogeneous admixture into water which contains said elastomer precipitant and sufficient sodium silicate in the presence of 50-99% of the total amount of filler added to form said filler-containing elastomer particles to coprecipitate the elastomer and the filler as a filler-containing elastomer premix while any elastomer solvent present is removed by distillation;
  c. adjusting the pH of the resultant aqueous suspension of elastomer premix, in the presence of a compound effecting the immediate precipitation of dissolved silicic acid, to a pH of 4.0 to 9.0; and
  d. mixing the thus-formed suspension of elastomer premix and precipitated silicic acid with the remainder of the intended total quantity of fillers in the form of an emulsifier-free aqueous suspension.

20. A process according to claim 19, further comprising separating the resultant product from residual water and drying the separated solids under constant agitation.

21. A process according to claim 20, wherein said elastomer latex or stable aqueous elastomer emulsion contains a plasticizer oil.

22. A process according to claim 20, wherein said elastomer filler contains a plasticizer oil.

* * * * *